(12) United States Patent
Li et al.

(10) Patent No.: US 12,725,263 B2
(45) Date of Patent: Sep. 1, 2026

(54) METHOD AND SYSTEM FOR POSITIONING TARGET IN BRAIN REGION

(71) Applicants: Beijing Tiantan Hospital, Capital Medical University, Beijing (CN); Beihang University, Beijing (CN)

(72) Inventors: Zixiao Li, Beijing (CN); Tao Liu, Beijing (CN); Yijun Zhou, Beijing (CN); Weili Jia, Beijing (CN); Xingxing Cao, Beijing (CN); Hao Liu, Beijing (CN); Yongjun Wang, Beijing (CN); Jing Jing, Beijing (CN); Lijun Zuo, Beijing (CN)

(73) Assignees: BEIJING TIANTAN HOSPITAL, CAPITAL MEDICAL UNIVERSITY, Beijing (CN); BEIHANG UNIVERSITY, Beijing (CN)

( * ) Notice: Subject to any disclaimer, the term of this patent is extended or adjusted under 35 U.S.C. 154(b) by 209 days.

(21) Appl. No.: 18/610,989

(22) Filed: Mar. 20, 2024

(65) Prior Publication Data

US 2024/0320836 A1 Sep. 26, 2024

(30) Foreign Application Priority Data

Mar. 20, 2023 (CN) ......................... 202310264485.4

(51) Int. Cl.
*G06T 7/11* (2017.01)
*G06T 3/14* (2024.01)

(52) U.S. Cl.
CPC .................. *G06T 7/11* (2017.01); *G06T 3/14* (2024.01); *G06T 2207/10092* (2013.01);

(Continued)

(58) Field of Classification Search
CPC ... G06T 7/11; G06T 3/14; G06T 2207/10092; G06T 2207/20081; G06T 2207/30016; G06T 2207/30096
See application file for complete search history.

(56) References Cited

U.S. PATENT DOCUMENTS

2022/0293244 A1 * 9/2022 Leuthardt .............. G16H 30/20

OTHER PUBLICATIONS

Chi, N., et al. "Cerebral Motor Functional Connectivity at the Acute Stage: An outcome predictor of Ischemic Stroke," Scientific Reports. vol. 8, 2018. p. 1-11 (Year: 2018).*

(Continued)

*Primary Examiner* — Sean A Frith
(74) *Attorney, Agent, or Firm* — Hoffmann & Baron, LLP

(57) ABSTRACT

A method and system for positioning a target in a brain region are provided. The method includes: obtaining datasets of N persons at a first time point and a second time point after stroke; constructing a first lesion mapping functional network based on each resting-state functional magnetic resonance imaging image in a first stroke dataset; constructing an acute phase cognitive-lesion mapping functional network; constructing a chronic phase cognitive-lesion mapping functional network; comparing the acute phase cognitive-lesion mapping functional network with the chronic phase cognitive-lesion mapping functional network to obtain a key improvement network; calculating a whole-brain functional connectivity network with each voxel as a seed point, and performing spatial correlation calculation on the whole-brain functional connectivity network and the key improvement network to obtain a spatial correlation network; and determining a therapeutic target of the functional image to be positioned.

6 Claims, 4 Drawing Sheets

(52) U.S. Cl.
CPC ............... *G06T 2207/20081* (2013.01); *G06T 2207/30016* (2013.01); *G06T 2207/30096* (2013.01)

(56) References Cited

OTHER PUBLICATIONS

Cohen, A., et al. "Lesion network mapping predicts post-stroke behavioral deficits and improves localization," Brain Journal of Neurology. vol. 144, 2021. p. 1-4 (Year: 2021).*
Li, Q., et al., "Dynamic Neural Network Changes Revealed by Voxel-Based Functional Connectivity Strength in Left Basal Ganglia Ischemic Stroke," frontiers in Neuroscience. vol. 14, 2020. p. 1-11 (Year: 2020).*
Moore, M., et al., "Lesion Symptom Mapping of Domain-Specific Cognitive Impairments using Routine Imaging in Stroke," medRxiv. 2021. p. 1-37 (Year: 2021).*
Pini, L., et al., "A novel stroke lesion network mapping approach: improved accuracy yet still low deficit prediction," Brain Communications. 2021. p. 1-16 (Year: 2021).*
Pirondini, E., et al., "Post-stroke reorganization of transient brain activity characterizes deficits and recovery of cognitive functions," NeuroImage. vol. 255, 2022. p. 1-13 (Year: 2022).*
First Office Action issued in Chinese Application No. 202310264485.4 on Jun. 2, 2023 and English translation thereof.

* cited by examiner

METHOD AND SYSTEM FOR POSITIONING TARGET IN BRAIN REGION

CROSS REFERENCE TO RELATED APPLICATION

This patent application claims the benefit and priority of Chinese Patent Application No. 202310264485.4, filed with the China National Intellectual Property Administration on Mar. 20, 2023, the disclosure of which is incorporated by reference herein in its entirety as part of the present application.

TECHNICAL FIELD

The present disclosure relates to the technical field of image processing, and in particular, to a method and system for positioning a target in a brain region.

BACKGROUND

Existing methods for exploring potential therapeutic targets are usually based directly on related functional anatomical structures or on whole-brain functional connectivity. However, the method based on whole-brain functional connectivity is prone to ignoring functional abnormalities caused by a lesion itself, and at present, the analysis method is based on only one time point, which has the problem of inaccurate therapeutic target positioning.

SUMMARY

An objective of the present disclosure is to provide a method and system for positioning a target in a brain region, which improve accuracy of therapeutic target positioning.

To achieve the above objective, the present disclosure provides the following solutions.

A method for positioning a target in a brain region includes:

obtaining a first stroke dataset and a second stroke dataset of set N persons, where sample data in the first stroke dataset is diffusion-weighted imaging (DWI) images and resting-state functional magnetic resonance imaging (fMRI) images of the N persons at a first time point after stroke, sample data in the second stroke dataset is resting-state fMRI images of the N persons at a second time point after stroke, and the second time point is longer than the first time point;

performing stroke lesion image segmentation on N DWI images in the first stroke dataset by means of a deep learning method to obtain N lesion masks;

registering the N lesion masks obtained by the segmentation to a brain standard space by linear transformation;

constructing, based on each resting-state fMRI image in the first stroke dataset, a first lesion mapping functional network with a lesion mask correspondingly registered to the brain standard space as a region of interest (ROI);

constructing an acute phase cognitive-lesion mapping functional network according to N first lesion mapping functional networks and a preset cognitive scale, where the preset cognitive scale includes cognitive scores of the N persons;

constructing, based on each resting-state fMRI image in the second stroke dataset, a second lesion mapping functional network with a lesion mask correspondingly registered to the brain standard space as an ROI;

constructing a chronic phase cognitive-lesion mapping functional network according to N second lesion mapping functional networks and a preset cognitive scale;

comparing the acute phase cognitive-lesion mapping functional network with the chronic phase cognitive-lesion mapping functional network to obtain a key improvement network;

calculating a whole-brain functional connectivity network with each voxel in a functional image to be positioned as a seed point, and performing spatial correlation calculation on the whole-brain functional connectivity network and the key improvement network to obtain a spatial correlation network, where the functional image to be positioned is a functional image obtained by registering a resting-state fMRI image to the brain standard space; and determining a therapeutic target of the functional image to be positioned according to the spatial correlation network.

Optionally, images in the first stroke dataset and the second stroke dataset are in neuroimaging informatics technology initiative (NIFTI) image format.

Optionally, the brain standard space is a brain standard space of Montreal Neurological Institute (MNI).

Optionally, the constructing, based on each resting-state fMRI image in the first stroke dataset, a first lesion mapping functional network with a lesion mask correspondingly registered to the brain standard space as an ROI specifically includes:

preprocessing N resting-state fMRI images in the first stroke dataset to obtain N first functional images of the brain standard space;

extracting, with each lesion mask registered to the brain standard space as an ROI, a lesion area from each first functional image corresponding to the brain standard space and determining an average signal of the lesion area; and determining, for each first functional image of the brain standard space, a correlation coefficient between the average signal of the lesion area and a signal of each voxel in a non-lesion area, to obtain the first lesion mapping functional network.

Optionally, the constructing an acute phase cognitive-lesion mapping functional network according to N first lesion mapping functional networks and a preset cognitive scale specifically includes:

constructing a linear model for each voxel according to the N first lesion mapping functional networks and the preset cognitive scale; and obtaining M linear models, where each first lesion mapping functional network includes M voxels;

selecting voxels corresponding to linear models with credibility greater than 95%, and recording the voxels as first cognitive impairment-related voxels; and setting a value at a position of each first cognitive impairment-related voxel in a first preset standard brain network as a hypothesis testing statistic t of a linear model corresponding to the first cognitive impairment-related voxel, and setting values at positions other than the positions of the first cognitive impairment-related voxels in the first preset standard brain network to 0 to obtain the acute phase cognitive-lesion mapping functional network.

Optionally, the linear model is expressed as:

$$y = a + bx_i + c_1 * \text{age} + c_2 * \text{sex} + c_3 * \text{education} + \varepsilon_i,\ i = 1, 2, 3, \ldots, M,$$

where y is a set of the cognitive scores of the N persons in the preset cognitive scale, $x_i$ denotes a value of an $i^{th}$ voxel of the N persons in the first lesion mapping functional network, age denotes an age covariant, sex denotes a sex covariant, education denotes an education level covariant, a denotes a constant, b denotes a first regression coefficient, $c_1$ denotes a second regression coefficient, $c_2$ denotes a third regression coefficient, $c_3$ denotes a fourth regression coefficient, and $\varepsilon_i$ is a residual term.

Optionally, the determining a therapeutic target of the functional image to be positioned according to the spatial correlation network specifically includes:

sequencing spatial correlation values in the spatial correlation network in a descending order, and taking spatial correlation values of a top set percentage; and taking a brain region whose vertical distance from scalp is less than or equal to 3 cm in the spatial correlation values of a top set percentage as the therapeutic target.

Optionally, the correlation coefficient is a Pearson correlation coefficient.

The present disclosure discloses a system for positioning a target in a brain region, including:

a processor; and a memory having programming instructions stored thereon, which, when executed by the processor, cause the processor to:

obtain a first stroke dataset and a second stroke dataset of set N persons, where sample data in the first stroke dataset is DWI images and resting-state fMRI images of the N persons at a first time point after stroke, sample data in the second stroke dataset is resting-state fMRI images of the N persons at a second time point after stroke, and the second time point is longer than the first time point;

perform stroke lesion image segmentation on N DWI images in the first stroke dataset by means of a deep learning method to obtain N lesion masks;

register the N lesion masks obtained by the segmentation to a brain standard space by linear transformation;

construct, based on each resting-state fMRI image in the first stroke dataset, a first lesion mapping functional network with a lesion mask correspondingly registered to the brain standard space as an ROI;

construct an acute phase cognitive-lesion mapping functional network according to N first lesion mapping functional networks and a preset cognitive scale, where the preset cognitive scale includes cognitive scores of the N persons;

construct, based on each resting-state fMRI image in the second stroke dataset, a second lesion mapping functional network with a lesion mask correspondingly registered to the brain standard space as an ROI;

construct a chronic phase cognitive-lesion mapping functional network according to N second lesion mapping functional networks and a preset cognitive scale;

compare the acute phase cognitive-lesion mapping functional network with the chronic phase cognitive-lesion mapping functional network to obtain a key improvement network;

calculate a whole-brain functional connectivity network with each voxel in a functional image to be positioned as a seed point, and perform spatial correlation calculation on the whole-brain functional connectivity network and the key improvement network to obtain a spatial correlation network, where the functional image to be positioned is a functional image obtained by registering a resting-state fMRI image to the brain standard space; and determine a therapeutic target of the functional image to be positioned according to the spatial correlation network.

According to specific embodiments of the present disclosure, the present disclosure has the following technical effects:

According to the present application, an acute phase cognitive-lesion mapping functional network and a chronic phase cognitive-lesion mapping functional network are obtained based on stroke datasets at a first time point and a second time point, respectively, so as to obtain a key improvement network, and spatial correlation calculation is performed on a whole-brain functional connectivity network and the key improvement network to obtain a spatial correlation network; and a therapeutic target of a functional image to be positioned is determined according to the spatial correlation network. A change in a lesion mapping network with time is used as the key to cognitive improvement, so that the accuracy of therapeutic target positioning is improved, and the therapeutic target is positioned more effectively.

BRIEF DESCRIPTION OF THE DRAWINGS

To describe the technical solutions in embodiments of the present disclosure or in the prior art more clearly, the accompanying drawings required in the embodiments are briefly described below. It should be noted that the accompanying drawings in the following description show merely some embodiments of the present disclosure, and other drawings can still be derived from these accompanying drawings by those of ordinary skill in the art without creative efforts.

DETAILED DESCRIPTION OF THE EMBODIMENTS

The technical solutions of the embodiments of the present disclosure are clearly and completely described below with reference to the accompanying drawings in the embodiments of the present disclosure. It should be noted that the described embodiments are merely some rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide a method and system for positioning a target in a brain region, which improve accuracy of therapeutic target positioning.

In order to make the above objective, features and advantages of the present disclosure clearer and more comprehensible, the present disclosure is further described in detail below in combination with the accompanying drawings and specific implementations.

Embodiment 1

Figure 1:
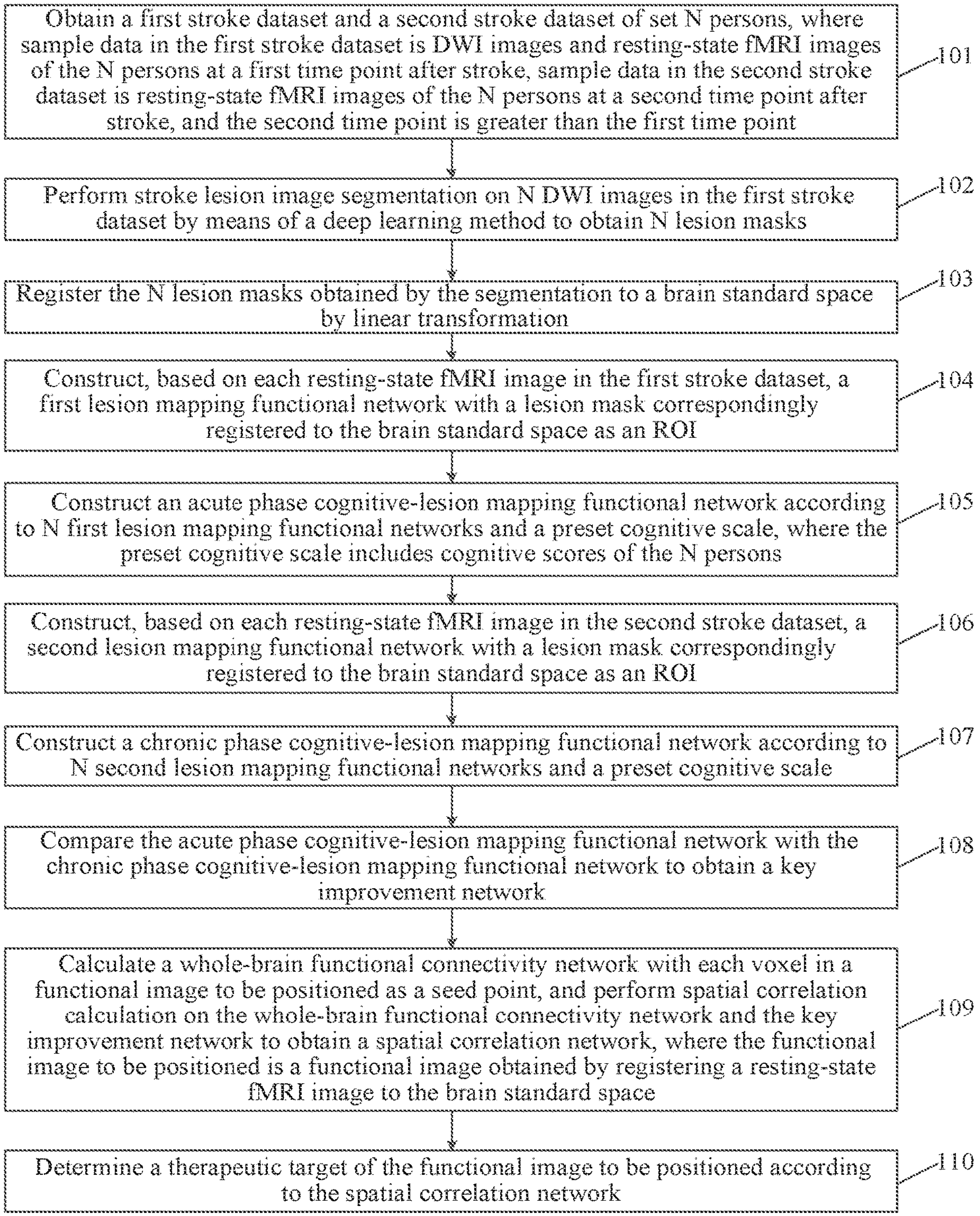
FIG. 1 is a schematic flowchart of a method for positioning a target in a brain region according to an embodiment of the present disclosure.
Figure 2:
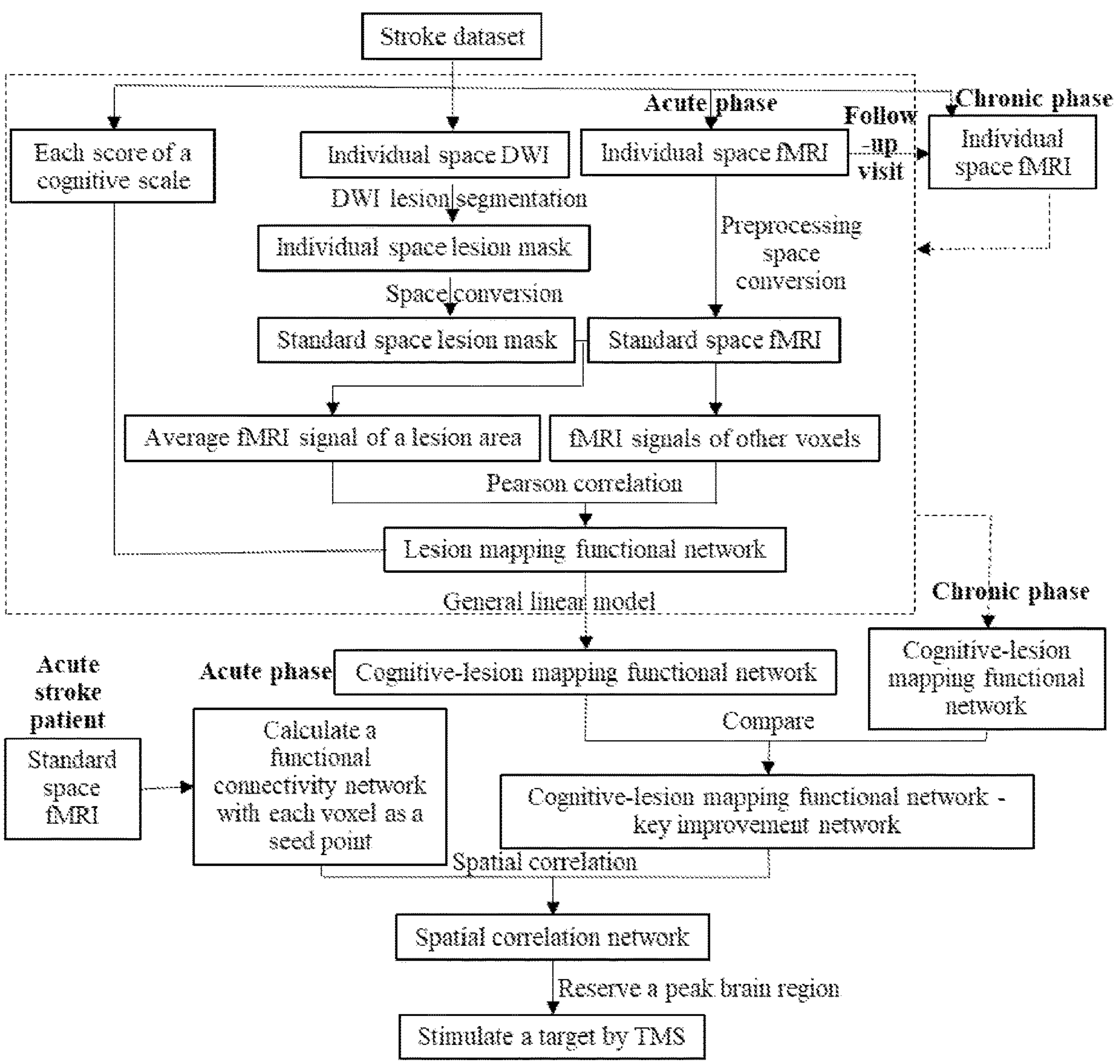
FIG. 2 is a schematic diagram illustrating a principle of a method for positioning a target in a brain region according to an embodiment of the present disclosure.

As shown in FIGS. 1 and 2, a method for positioning a target in a brain region according to this embodiment includes the following steps.

Step 101: Obtain a first stroke dataset and a second stroke dataset of set N persons, where sample data in the first stroke dataset is DWI images and resting-state fMRI images of the N persons at a first time point after stroke, sample data in the second stroke dataset is resting-state fMRI images of the N persons at a second time point after stroke, and the second time point is longer than the first time point.

The set N persons are aged within a set range, with a sex ratio within a set range.

In a specific embodiment, the N persons are aged from 40 to 65, with a sex ratio of 1:1. The first time point is an acute phase after stroke, such as 7 to 14 days after onset. The second time point is a chronic phase after stroke, such as 3 months after the onset.

The DWI images and the resting-state fMRI images are obtained through scanning by a magnetic resonance imaging (MRI) machine.

Images in the first stroke dataset and the second stroke dataset are in NIFTI image format. That is, according to the present disclosure, digital imaging and communications in medicine (DICOM)-to-NIFTI image format conversion is performed on collected image data, thereby obtaining the first stroke dataset and the second stroke dataset according to the present disclosure.

Step 102: Perform stroke lesion image segmentation on N DWI images in the first stroke dataset by means of a deep learning method to obtain N lesion masks.

Step 102 specifically includes: performing stroke lesion image segmentation on N DWI images in the first stroke dataset by means of a no-new U-Net (nnU-Net) deep learning method to obtain N lesion masks, and performing quality control by two experienced imaging clinicians to ensure accuracy of lesion segmentation.

Step 103: Register the N lesion masks obtained by the segmentation to a brain standard space by linear transformation.

The brain standard space is a brain standard space of MNI, that is, an MNI standard space.

Step 104: Construct, based on each resting-state fMRI image in the first stroke dataset, a first lesion mapping functional network with a lesion mask correspondingly registered to the brain standard space as an ROI.

Step 104 specifically includes:

- preprocessing N resting-state fMRI images in the first stroke dataset to obtain N first functional images of the brain standard space, where
- the preprocessing specifically includes: performing removal of unstable time points, slice time correction, magnetic field deformation correction, motion correction, removal of noise signals from white matter, cerebrospinal fluid, and the like, structural image registration, filtering, spatial standardization, and spatial smoothing on the resting-state fMRI images to obtain the first functional images of the brain standard space;
- extracting, with each lesion mask registered to the brain standard space as an ROI, a lesion area from each first functional image corresponding to the brain standard space and determining an average signal of the lesion area; and
- determining, for each first functional image of the brain standard space, a Pearson correlation coefficient between the average signal of the lesion area and a signal of each voxel (the remaining voxels other than the lesion area) in a non-lesion area, to obtain a functional connectivity matrix between the lesion area and the whole brain (a value of each voxel in the matrix is a Pearson correlation coefficient), that is, the first lesion mapping functional network.

Step 105: Construct an acute phase cognitive-lesion mapping functional network according to N first lesion mapping functional networks and a preset cognitive scale, where the preset cognitive scale includes cognitive scores of the N persons.

Step 105 specifically includes:

- constructing a linear model (that is, constructing a general linear model for voxels x of N samples and cognitive scores of the N samples) for each voxel according to the N first lesion mapping functional networks and the preset cognitive scale; and obtaining M linear models, where each first lesion mapping functional network includes M voxels;
- performing hypothesis testing on the M linear models, selecting voxels corresponding to linear models with credibility greater than 95%, and recording the voxels as first cognitive impairment-related voxels; and
- setting a value at a position of each first cognitive impairment-related voxel in a first preset standard brain network as a hypothesis testing statistic t of a linear model corresponding to the first cognitive impairment-related voxel, and setting values at positions other than the positions of the first cognitive impairment-related voxels in the first preset standard brain network to 0 to obtain the acute phase cognitive-lesion mapping functional network, that is, a cognitive-lesion mapping functional network most related to cognitive impairment (the value of each voxel is the value t obtained through the hypothesis testing).

For an $i^{th}$ voxel in the N samples and cognitive scores y of the N samples, a general linear model is constructed, and is expressed as:

$$y = a + bx_i + c_1 * \text{age} + c_2 * \text{sex} + c_3 * \text{education} + \varepsilon_i,\ i = 1, 2, 3, \ldots, M,$$

where y denotes a set of the cognitive scores of the N persons in the preset cognitive scale, and y is a matrix of N×1; $x_i$ denotes a value of an $i^{th}$ voxel of the N persons in the first lesion mapping functional network, and $x_i$ is a matrix of N×1; age denotes an age covariant, sex denotes a sex covariant, education denotes an education level covariant, a denotes a constant, b denotes a first regression coefficient, $c_1$ denotes a second regression coefficient, $c_2$ denotes a third regression coefficient, $c_3$ denotes a fourth regression coefficient, and $c_1$ is a residual term.

Hypothesis testing is performed on the general linear model, and when $p<0.05$, a regression coefficient b is considered statistically significant. The value of p is 1 minus the credibility of the general linear model.

Step 106: Construct, based on each resting-state fMRI image in the second stroke dataset, a second lesion mapping functional network with a lesion mask correspondingly registered to the brain standard space as an ROI.

Step 106 specifically includes:

preprocessing N resting-state fMRI images in the second stroke dataset to obtain N second functional images of the brain standard space;

extracting, with each lesion mask registered to the brain standard space as an ROI, a lesion area from each second functional image corresponding to the brain standard space and determining an average signal of the lesion area; and determining, for each second functional image of the brain standard space, a correlation coefficient between the average signal of the lesion area and a signal of each voxel in a non-lesion area, to obtain the second lesion mapping functional network.

Step 107: Construct a chronic phase cognitive-lesion mapping functional network according to N second lesion mapping functional networks and a preset cognitive scale.

Step 107 specifically includes:

constructing a linear model for each voxel according to the N second lesion mapping functional networks and the preset cognitive scale; and obtaining M linear models, where each second lesion mapping functional network includes M voxels;

selecting voxels corresponding to linear models with credibility greater than 95%, and recording the voxels as second cognitive impairment-related voxels; and setting a value at a position of each second cognitive impairment-related voxels in a second preset standard brain network as a hypothesis testing statistic t of a linear model corresponding to the second cognitive impairment-related voxel, and setting values at positions other than the positions of the second cognitive impairment-related voxels in the second preset standard brain network to 0 to obtain the chronic phase cognitive-lesion mapping functional network.

Step 108: Compare the acute phase cognitive-lesion mapping functional network with the chronic phase cognitive-lesion mapping functional network to obtain a key improvement network.

The key improvement network is configured to reflect changes at the first time point and the second time point.

Step 109: Calculate a whole-brain functional connectivity network with each voxel in a functional image to be positioned as a seed point, and perform spatial correlation calculation on the whole-brain functional connectivity network and the key improvement network to obtain a spatial correlation network.

The functional image to be positioned is a functional image obtained by registering a resting-state fMRI image to the brain standard space.

In step 101, the set N persons are a batch of persons who meet a set age range and a set sex ratio. The age of a patient in the functional image to be positioned in step 109 falls within the set age range. The set age range is 40-65 years old, and the set sex ratio a male-female ratio that is 1:1.

Step 109 specifically includes: calculating, with a first voxel in the functional image to be positioned as a seed point, a Pearson correlation coefficient between the seed point and all other voxels remaining in the functional image to be positioned, to obtain a whole-brain functional connectivity network corresponding to the first seed point; then selecting a second voxel as a seed point, and repeating the above steps, where the first functional image in the standard space has a total of M voxels, and M whole-brain functional connectivity networks may be calculated.

The value of each voxel in the spatial correlation network is a spatial correlation coefficient.

Step 110: Determine a therapeutic target of the functional image to be positioned according to the spatial correlation network.

In this embodiment, a brain region with a large spatial correlation and close to superficial scalp is reserved as a potential therapeutic target of transcranial magnetic stimulation (TMS) to improve cognitive impairment after stroke.

Step 110 specifically includes:

sequencing spatial correlation values in the spatial correlation network in a descending order, and taking spatial correlation values of a top set percentage; and taking a brain region whose vertical distance from scalp is less than or equal to 3 cm in the spatial correlation values of a top set percentage as the therapeutic target.

In this embodiment, the percentage is set to 10%, and a brain region whose vertical distance from scalp is less than or equal to 3 cm in top 10% of the spatial correlation values is taken as the therapeutic target.

According to the present disclosure, with cognitive impairment after stroke as a starting point, a change in a cognitive-lesion mapping functional network with time, which is more targeted, is taken into account, so as to more accurately find a key network most related to cognitive improvement. A spatial correlation method is applied to finally determine the therapeutic target of TMS, instead of directly taking a peak point in the key improvement network as the therapeutic target. This method has the advantage that stimulating the target with the highest spatial correlation with the key improvement network can indirectly stimulate the entire key improvement network, thus improving the effectiveness of therapeutic target positioning.

According to the present disclosure, individualized lesion information of each sample in the stroke datasets is used during calculation of the lesion mapping network, and thus the potential therapeutic target finally obtained has good generalization.

Embodiment 2

A method for positioning a target in a brain region according to this embodiment includes the following steps.

S1: Perform DICOM-to-NIFTI image format conversion on image data of large sample stroke datasets with age and sex matching, and two time points.

S2: Perform automatic stroke lesion segmentation on DWI data of a total of N samples by means of an nnU-Net deep learning method, and perform quality control by two experienced imaging clinicians to ensure accuracy of lesion segmentation.

S3: Register N lesion masks obtained by segmentation to a brain standard space of MNI (that is, an MNI standard space) by linear transformation.

S4: Preprocess resting-state fMRI images of the N samples at a first time point (acute phase, within 7-14 days after onset). The preprocessing specifically includes: performing removal of unstable time points, slice time correction, magnetic field deformation correction, motion correction, removal of noise signals from white matter, cerebrospinal fluid, and the like, structural image registration, filtering, spatial standardization, spatial smoothing, and other steps to obtain functional images of the MNI standard space.

S5: Extract an average signal of a lesion area of the functional image with a lesion mask as an ROI in the standard space.

S6: Perform Pearson correlation calculation between the average signal of the lesion area and a signal of each of all other voxels remaining in the functional image, to obtain a functional connectivity matrix between the lesion area and the whole brain (a value of each voxel is a Pearson correlation coefficient), that is, a lesion mapping functional network.

S7: Construct a general linear model between each voxel in the lesion mapping functional network and scores of a cognitive scale (that is, construct a general linear model between a voxel x of the N samples and cognitive scores of the N samples), and perform hypothesis testing to obtain a cognitive-lesion mapping functional network most related to cognitive impairment (the value of each voxel is a value t obtained by hypothesis testing).

S8: Preprocess resting-state fMRI images of the N samples at a second time point (chronic phase, which is within 3 month after the onset) with reference to step S4, and repeat steps S5 to S7 to obtain a chronic phase cognitive-lesion mapping functional network.

S9: Compare the acute phase cognitive-lesion mapping functional network obtained in step S7 with the chronic phase cognitive-lesion mapping functional network obtained in step S8 to obtain a key improvement network with the most significant changes at two time points.

S10: For the functional image in the standard space that is obtained in step S4, calculate a whole-brain functional connectivity network with each voxel as a seed point, and perform spatial correlation calculation with the cognitive-lesion mapping functional network—key improvement network obtained in step S9 to obtain a spatial correlation network (the value of each voxel is a spatial correlation coefficient).

S11: Reserve a brain region with a large spatial correlation and close to superficial scalp as a potential therapeutic target of TMS to improve cognitive impairment after stroke.

Embodiment 3

Figure 3:
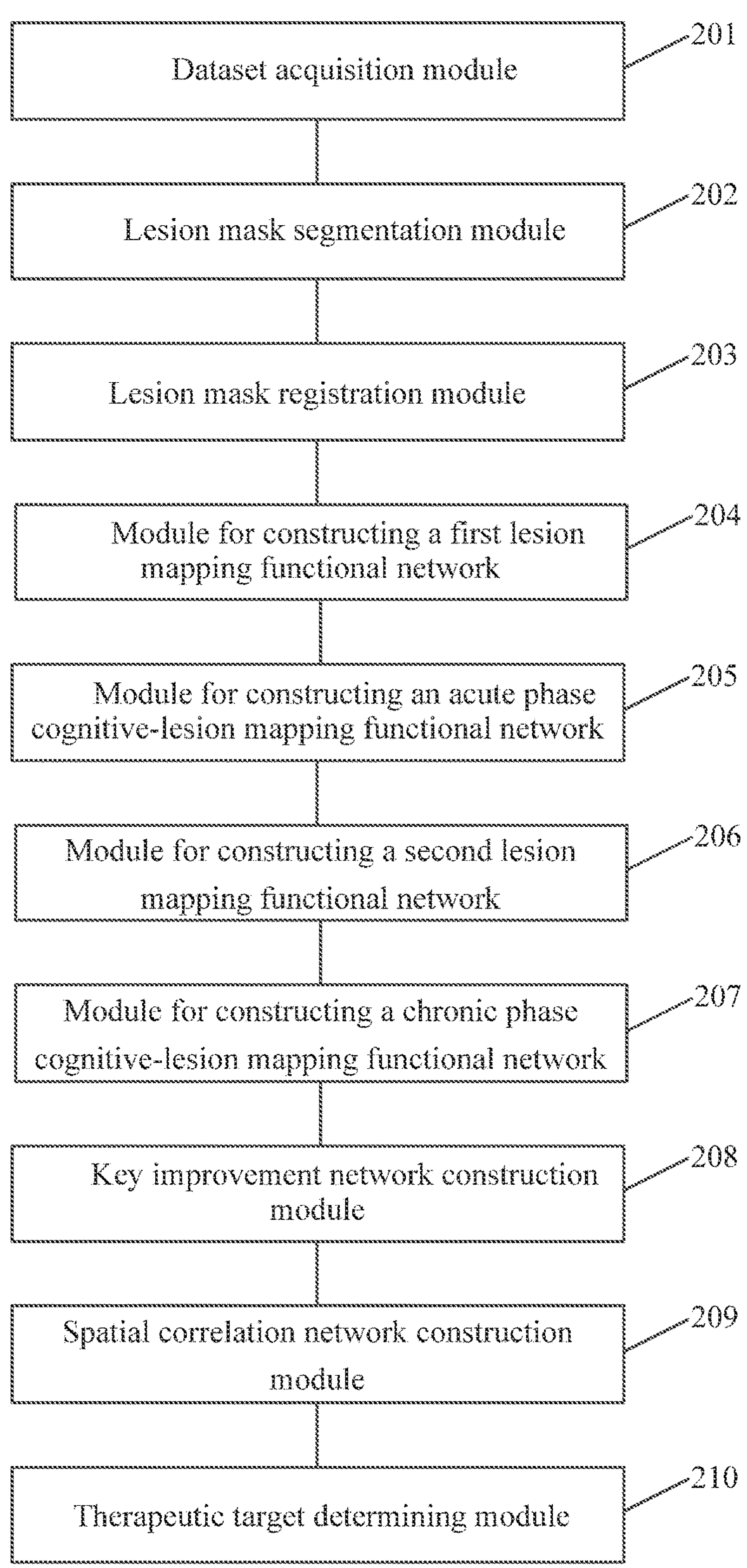
FIG. 3 is a schematic structural diagram of a system for positioning a target in a brain region according to an embodiment of the present disclosure.

FIG. 3 is a schematic structural diagram of a system for positioning a target in a brain region according to an embodiment of the present disclosure. As shown in FIG. 3, a system for positioning a target in a brain region includes:

a dataset acquisition module 201, configured to obtain a first stroke dataset and a second stroke dataset of set N persons, where sample data in the first stroke dataset is DWI images and resting-state fMRI images of the N persons at a first time point after stroke, sample data in the second stroke dataset is resting-state fMRI images of the N persons at a second time point after stroke, and the second time point is longer than the first time point;

a lesion mask segmentation module 202, configured to perform stroke lesion image segmentation on N DWI images in the first stroke dataset by means of a deep learning method to obtain N lesion masks;

a lesion mask registration module 203, configured to register the N lesion masks obtained by the segmentation to a brain standard space by linear transformation;

a module 204 for constructing a first lesion mapping functional network, configured to construct, based on each resting-state fMRI image in the first stroke dataset, a first lesion mapping functional network with a lesion mask correspondingly registered to the brain standard space as an ROI;

a module 205 for constructing an acute phase cognitive-lesion mapping functional network, configured to construct an acute phase cognitive-lesion mapping functional network according to N first lesion mapping functional networks and a preset cognitive scale, where the preset cognitive scale includes cognitive scores of the N persons;

a module 206 for constructing a second lesion mapping functional network, configured to construct, based on each resting-state fMRI image in the second stroke dataset, a second lesion mapping functional network with a lesion mask correspondingly registered to the brain standard space as an ROI;

a module 207 for constructing a chronic phase cognitive-lesion mapping functional network, configured to construct a chronic phase cognitive-lesion mapping functional network according to N second lesion mapping functional networks and a preset cognitive scale;

a key improvement network construction module 208, configured to compare the acute phase cognitive-lesion mapping functional network with the chronic phase cognitive-lesion mapping functional network to obtain a key improvement network;

a spatial correlation network construction module 209, configured to calculate a whole-brain functional connectivity network with each voxel in a functional image to be positioned as a seed point, and perform spatial correlation calculation on the whole-brain functional connectivity network and the key improvement network to obtain a spatial correlation network, where the functional image to be positioned is a functional image obtained by registering a resting-state fMRI image to the brain standard space; and a therapeutic target determining module 210, configured to determine a therapeutic target of the functional image to be positioned according to the spatial correlation network.

In addition, it should also be noted herein that the respective composite parts in the above system can be configured by software, firmware, hardwire or a combination thereof. Specific means or manners that can be used for the configuration will not be stated repeatedly herein since they are well-known to those skilled in the art. In case of implementation by software or firmware, programs constituting the software are installed from a storage medium or a network to a computer (e.g. the universal computer 400 as shown in FIG. 4) having a dedicated hardware structure; the computer, when installed with various programs, can implement various functions and the like.

Figure 4:
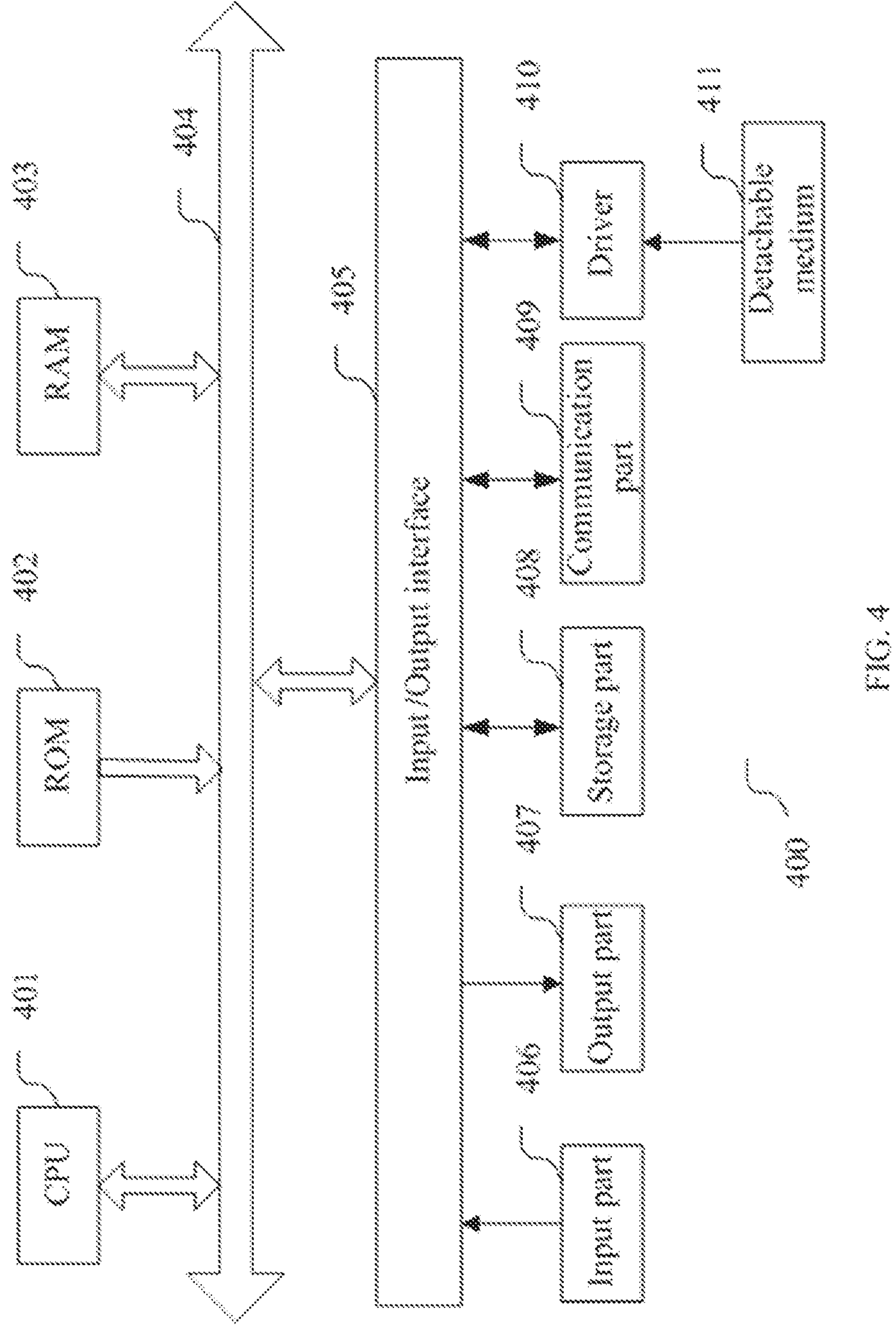
FIG. 4 shows a schematic block diagram of a computer that can be used for implementing the method and the system according to the embodiments of the present disclosure.

FIG. 4 shows a schematic block diagram of a computer that can be used for implementing the method and the system according to the embodiments of the present disclosure.

In FIG. 4, a central processing unit (CPU) 401 executes various processing according to a program stored in a read-only memory (ROM) 402 or a program loaded from a storage part 408 to a random access memory (RAM) 403. In the RAM 403, data needed at the time of execution of various processing and the like by the CPU 401 is also stored according to requirements. The CPU 401, the ROM 402 and the RAM 403 are connected to each other via a bus 404. An input/output interface 405 is also connected to the bus 404.

The following components are connected to the input/output interface 405: an input part 406 (including a keyboard, a mouse and the like); an output part 407 (including a display, such as a Cathode Ray Tube (CRT), a Liquid Crystal Display (LCD) and the like, as well as a loudspeaker and the like); the storage part 408 (including a hard disc and the like); and a communication part 409 (including a network interface card such as an LAN card, a modem and so on). The communication part 409 performs communication processing via a network such as the Internet. According to requirements, a driver 410 may also be connected to the input/output interface 405. A detachable medium 411 such as a magnetic disc, an optical disc, a magnetic optical disc, a semiconductor memory and the like may be installed on the driver 410 according to requirements, such that a computer program read therefrom is installed in the storage part 408 according to requirements.

In the case of carrying out the foregoing series of processing by software, programs constituting the software are installed from a network such as the Internet or a storage medium such as the detachable medium 411.

Those skilled in the art should appreciate that such a storage medium is not limited to the detachable medium 411 storing therein a program and distributed separately from the apparatus to provide the program to a user as shown in FIG. 4. Examples of the detachable medium 411 include a magnetic disc (including floppy disc (registered trademark)), a compact disc (including compact disc read-only memory (CD-ROM) and digital versatile disc (DVD), a magneto optical disc (including mini disc (MD)(registered trademark)), and a semiconductor memory. Or, the storage medium may be hard discs and the like included in the ROM 402 and the storage part 408 in which programs are stored, and are distributed concurrently with the apparatus including them to users.

The present disclosure further proposes a program product storing therein a machine-readable instruction code that, when read and executed by a machine, can implement the aforesaid method according to the embodiment of the present disclosure.

Correspondingly, a storage medium for carrying the program product storing therein the machine-readable instruction code is also included in the disclosure of the present disclosure. The storage medium includes but is not limited to a floppy disc, an optical disc, a magnetic optical disc, a memory card, a memory stick and the like.

Embodiments of this description are described in a progressive manner, each embodiment focuses on the difference from other embodiments, and for the same and similar parts between the embodiments, reference may be made to each other. Since the system disclosed in an embodiment corresponds to the method disclosed in an embodiment, the description is relatively simple, and for related contents, reference may be made to the description of the method.

Specific examples are used herein to explain the principles and implementations of the present disclosure. The foregoing description of the embodiments is merely intended to help understand the method of the present disclosure and its core ideas; besides, changes may be made by those of ordinary skill in the art to specific implementations and the scope of application in accordance with the ideas of the present disclosure. In conclusion, the content of this description shall not be construed as limitations to the present disclosure.

What is claimed is:

1. A method for positioning a target in a brain region, the method comprising:

obtaining a first stroke dataset and a second stroke dataset of set N persons, wherein sample data in the first stroke dataset is N diffusion-weighted imaging (DWI) images and N resting-state functional magnetic resonance imaging (fMRI) images of the N persons at a first time point after stroke, sample data in the second stroke dataset is N resting-state fMRI images of the N persons at a second time point after stroke, and the second time point is longer than the first time point;

performing stroke lesion image segmentation on N DWI images in the first stroke dataset by a no-new U-Net (nnU-Net) deep learning method to obtain N lesion masks;

registering the N lesion masks obtained by the segmentation to a brain standard space by linear transformation to obtain N standard-space lesion masks;

constructing N first lesion mapping functional networks based on the N resting-state fMRI images in the first stroke dataset and the N standard-space lesion masks;

constructing an acute phase cognitive-lesion mapping functional network according to the N first lesion mapping functional networks and a preset cognitive scale, comprising:

constructing a linear model for each voxel according to the N first lesion mapping functional networks and the preset cognitive scale; and obtaining M linear models, wherein each first lesion mapping functional network comprises M voxels, and the preset cognitive scale comprises cognitive scores of the N persons; and wherein the linear model is expressed as:

$$y = a + b*x_i + c_1*\text{age} + c_2*\text{sex} + c_3*\text{education} + \varepsilon_i,\ i = 1, 2, 3, \ldots, M,$$

wherein y is a set of the cognitive scores of the N persons in the preset cognitive scale, $x_i$ denotes a value of an $i^{th}$ voxel of the N persons in a corresponding first lesion mapping functional network, age denotes an age covariant, sex denotes a sex covariant, education denotes an education level covariant, a denotes a constant, b denotes a first regression coefficient, $c_1$ denotes a second regression coefficient, $c_2$ denotes a third regression coefficient, $c_3$ denotes a fourth regression coefficient, and $\varepsilon_i$ is a residual term;

selecting voxels corresponding to linear models with credibility greater than 95%, and recording the voxels as first cognitive impairment-related voxels; and setting a value at a position of each first cognitive impairment-related voxel in a first preset standard brain network as a hypothesis testing statistic t of a linear model corresponding to the first cognitive impairment-related voxel, and setting values at positions other than the positions of the first cognitive impairment-related voxels in the first preset standard brain network to 0 to obtain the acute phase cognitive-lesion mapping functional network;

constructing N second lesion mapping functional networks based on the N resting-state fMRI images in the second stroke dataset and the N standard-space lesion masks;

constructing a chronic phase cognitive-lesion mapping functional network according to the N second lesion mapping functional networks and the preset cognitive scale;

comparing the acute phase cognitive-lesion mapping functional network with the chronic phase cognitive-lesion mapping functional network to obtain a key improvement network for reflecting changes at the first time point and the second time point;

calculating a whole-brain functional connectivity network with each voxel in a functional image to be positioned as a seed point, and performing spatial correlation calculation on the whole-brain functional connectivity network and the key improvement network to obtain a spatial correlation network, wherein the functional image to be positioned is a functional image obtained by registering an unprocessed resting-state fMRI image to the brain standard space; and determining a therapeutic target of the functional image to be positioned according to the spatial correlation network.

2. The method for positioning a target in a brain region according to claim 1, wherein images in the first stroke dataset and the second stroke dataset are in neuroimaging informatics technology initiative (NIFTI) image format.

3. The method for positioning a target in a brain region according to claim 1, wherein the brain standard space is a brain standard space of Montreal Neurological Institute (MNI).

4. The method for positioning a target in a brain region according to claim 1, wherein constructing the N first lesion mapping functional networks based on the N resting-state fMRI images in the first stroke dataset and the N standard-space lesion masks comprises:

preprocessing the N resting-state fMRI images in the first stroke dataset to obtain N first functional images of the brain standard space;

extracting, with each of the N standard-space lesion masks as a region of interest (ROI), a lesion area from a corresponding first functional image of the N first functional images and determining an average signal of the lesion area; and determining, for each first functional image of the brain standard space, a correlation coefficient between the average signal of the lesion area and a signal of each voxel in a non-lesion area, to obtain the corresponding first lesion mapping functional network.

5. The method for positioning a target in a brain region according to claim 1, wherein the correlation coefficient is a Pearson correlation coefficient.

6. A system for positioning a target in a brain region, the system comprising:

a processor; and a memory having programming instructions stored thereon, which, when executed by the processor, cause the processor to:

obtain a first stroke dataset and a second stroke dataset of set N persons, wherein sample data in the first stroke dataset is N DWI images and N resting-state fMRI images of the N persons at a first time point after stroke, sample data in the second stroke dataset is N resting-state fMRI images of the N persons at a second time point after stroke, and the second time point is longer than the first time point;

perform stroke lesion image segmentation on N DWI images in the first stroke dataset by a no-new U-Net (nnU-Net) deep learning method to obtain N lesion masks;

register the N lesion masks obtained by the segmentation to a brain standard space by linear transformation to obtain N standard-space lesion masks;

construct N first lesion mapping functional networks based on the N resting-state fMRI images in the first stroke dataset and the N standard-space lesion masks;

construct an acute phase cognitive-lesion mapping functional network according to the N first lesion mapping functional networks and a preset cognitive scale, comprising:

construct a linear model for each voxel according to the N first lesion mapping functional networks and the preset cognitive scale; and obtaining M linear models, wherein each first lesion mapping functional network comprises M voxels, and the preset cognitive scale comprises cognitive scores of the N persons; and wherein the linear model is expressed as;

$$y = a + b * x_i + c_1 * \text{age} + c_2 * \text{sex} + c_3 * \text{education} + \varepsilon_i, \ = 1, 2, 3, \ldots, M,$$

wherein y is a set of the cognitive scores of the N persons in the preset cognitive scale, $x_i$ denotes a value of an $i^{th}$ voxel of the N persons in a corresponding first lesion mapping functional network, age denotes an age covariant, sex denotes a sex covariant, education denotes an education level covariant, a denotes a constant, b denotes a first regression coefficient, $c_1$ denotes a second regression coefficient, $c_2$ denotes a third regression coefficient, ca denotes a fourth regression coefficient, and $\varepsilon_i$ is a residual term;

select voxels corresponding to linear models with credibility greater than 95%, and record the voxels as first cognitive impairment-related voxels; and set a value at a position of each first cognitive impairment-related voxel in a first preset standard brain network as a hypothesis testing statistic t of a linear model corresponding to the first cognitive impairment-related voxel, and set values at positions other than the positions of the first cognitive impairment-related voxels in the first preset standard brain network to 0 to obtain the acute phase cognitive-lesion mapping functional network;

construct N second lesion mapping functional networks based on the N resting-state fMRI images in the second stroke dataset and the N standard-space lesion masks;

construct a chronic phase cognitive-lesion mapping functional network according to the N second lesion mapping functional networks and the preset cognitive scale;

compare the acute phase cognitive-lesion mapping functional network with the chronic phase cognitive-lesion mapping functional network to obtain a key improvement network for reflecting changes at the first time point and the second time point;

calculate a whole-brain functional connectivity network with each voxel in a functional image to be positioned as a seed point, and perform spatial correlation calculation on the whole-brain functional connectivity network and the key improvement network to obtain a spatial correlation network, wherein the functional image to be positioned is a functional image obtained by registering an unprocessed resting-state fMRI image to the brain standard space; and determine a therapeutic target of the functional image to be positioned according to the spatial correlation network.

* * * * *